(12) United States Patent
Moon et al.

(10) Patent No.: US 8,351,054 B2
(45) Date of Patent: Jan. 8, 2013

(54) APPARATUS DETECTING A POSITION OF A FUNCTIONAL LAYER ON AN ELECTRODE

(75) Inventors: So-Il Moon, Suwon-si (KR); Jee-Sang Hwang, Suwon-si (KR); Su-Hwan Kim, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 397 days.

(21) Appl. No.: 12/829,733

(22) Filed: Jul. 2, 2010

(65) Prior Publication Data

US 2011/0102809 A1  May 5, 2011

(30) Foreign Application Priority Data

Nov. 3, 2009  (KR) .................. 10-2009-0105451

(51) Int. Cl.
*G01B 11/14* (2006.01)

(52) U.S. Cl. ....................................... 356/614

(58) Field of Classification Search .................. 356/614, 356/630, 634, 635
See application file for complete search history.

(56) References Cited

U.S. PATENT DOCUMENTS

| | | | |
|---|---|---|---|
| 5,795,394 A * | 8/1998 | Belotserkovsky et al. | ... 118/665 |
| 6,857,171 B2 * | 2/2005 | Kawaguchi et al. | ........ 29/2 |
| 7,679,739 B2 | 3/2010 | Hayashi et al. | |
| 2005/0252516 A1 | 11/2005 | Izumiya et al. | |
| 2008/0299461 A1 | 12/2008 | Kim | |
| 2010/0046794 A1 | 2/2010 | Hayashi et al. | |

FOREIGN PATENT DOCUMENTS

| | | |
|---|---|---|
| JP | 09-180735 | 7/1997 |
| JP | 2001-307778 | 11/2001 |
| JP | 2004-195272 A | 7/2004 |
| JP | 2007-066821 | 3/2007 |
| JP | 2007-242575 | 9/2007 |
| KR | 10-2007-0088678 | 8/2007 |
| KR | 10-2008-0105853 | 12/2008 |

\* cited by examiner

*Primary Examiner* — Roy M Punnoose
(74) *Attorney, Agent, or Firm* — Knobbe Martens Olson & Bear LLP (57) ABSTRACT

An apparatus detecting the position of the functional layer of the electrode plate includes a first electrode plate sensor disposed at a side of a material to sense start points of electrode plates continuously formed on the material at uniform intervals, a second electrode plate sensor disposed at an other side of the material to sense a length of the electrode plate, a functional layer sensor provided behind the first electrode plate sensor and the second electrode plate sensor above a material traveling direction to sense position and length of the functional layer formed on the electrode by sensing a difference in color, and a controller feeding back a feedback result indicating whether the functional layer is correctly coated through values sensed by the first electrode plate sensor, the second electrode plate sensor, and the functional layer sensor.

28 Claims, 5 Drawing Sheets

APPARATUS DETECTING A POSITION OF A FUNCTIONAL LAYER ON AN ELECTRODE

CROSS-REFERENCE TO RELATED APPLICATION

This application claims the benefit of Korean Patent Application No. 10-2009-0105451, filed Nov. 3, 2009, in the Korean Intellectual Property Office, the disclosure of which is incorporated herein by reference.

BACKGROUND

1. Field

Aspects of the present invention relate to an apparatus detecting a position of a functional layer on an electrode, and more particularly, to an apparatus detecting the position of an electrode and capable of detecting a functional layer coated on an electrode disposed on a material.

2. Description of the Related Art

Recently, as developments and demands on a mobile technology increase, use of a secondary battery as an energy source is rapidly increasing. Therefore, research on a battery that may satisfy various performance requirements are being conducted. In particular, research is being conducted on a lithium secondary battery having high energy density, a stable discharge voltage and a high output.

In general, in a secondary battery, after an active material is coated on the surface of a collector to form a positive electrode and a negative electrode and a separator is interposed between the positive electrode and the negative electrode to form an electrode assembly, the electrode assembly is mounted in a cylindrical or polygonal metal can or a pouch type case made of an aluminum laminate sheet. A liquid electrolyte is injected into the electrode assembly or the electrode assembly is impregnated with the liquid electrolyte or a solid electrolyte is used to manufacture the secondary battery.

In order to improve thermal stability of the secondary battery, a functional layer is coated on an electrode plate which is coated on a material that is the collector. The functional layer is coated on to the electrode plate by a coater having the functional layer material in a slurry state before being coated. The functional layer is a semi-transparent white color in a slurry state and is coated on the electrode plate on the material in the form of a thin film according to a predetermined pattern. The functional layer is coated on the electrode plate at a thickness of 10 to 15 µm and is semi-transparent after being coated and before being dried.

The functional layer as described above should be coated on the electrode plate in a correct position. However, current pattern recognizing apparatuses do not distinguish the electrode plate from the functional layer disposed on the electrode plate. If the functional layer is not coated on the electrode plate in the correct position, a coating position defect occurs in a winding process and local pressure is applied to a part where the defect occurs and the shape of a battery cell is not uniform after the winding process. In addition, the part to which the local pressure is applied is not impregnated with the electrolyte and lithium ions do not smoothly move between the negative electrode and the positive electrode. Thus, if the functional layer is not coated in the correct position, the thermal stability of the battery, which is provided by the functional layer, is affected.

Therefore, an apparatus sensing whether a previously coated functional layer is coated in a correct position and without an error is beneficial in order to correctly sense and adjust a position of a subsequent functional layer to be coated after the previously coated functional layer is coated on the electrode plate.

In general, in the case of a laser sensor or an infrared ray sensor applied to a common pattern coating process, a previously coated functional layer formed with the semi-transparent slurry is not correctly sensed, and thus, an error in the position of the previously coated functional layer is not sensed. When quality of a functional layer coating becomes poor due to the above problems, the quality of a coated functional layer may not be managed because no feedback is transmitted to the functional layer coater.

SUMMARY

Aspects of the present invention provide an apparatus detecting a position of a functional layer coated on an electrode and capable of precisely measuring the position of the functional layer that is semi-transparently coated on the electrode that is disposed on a material and that is not dried and of feeding back the measurement result in order to improve coating quality and productivity.

According to aspects of the present invention, there is provided an apparatus detecting a position of a functional layer on an electrode plate, including a first electrode plate sensor disposed at a side of a material to sense start points of electrode plates continuously formed on the material at uniform intervals, a second electrode plate sensor disposed at an other side of the material to sense a length of the electrode plate, a functional layer sensor provided behind the first electrode plate sensor and the second electrode plate sensor above a material traveling direction to sense position and length of the functional layer formed on the electrode by sensing a difference in color, and a controller feeding back a feedback result indicating whether the functional layer is correctly positioned through values sensed by the first electrode plate sensor, the second electrode plate sensor, and the functional layer sensor.

According to an aspect of the present invention, the controller includes an operating unit calculating a length between adjacent electrode plates and a start point and an end point to be coated with the functional layer according to the values sensed by the first electrode plate sensor and the second electrode plate sensor, a comparing unit comparing the position of the functional layer to be coated according to calculations of the operating unit with the position of the previously coated functional layer, and a defect detecting unit comparing the values calculated by the operating unit with each other and feeding back the feedback result indicating whether the functional layer to be coated is correctly positioned.

According to an aspect of the present invention, the defect detecting unit compares the length of the functional layer sensed by the functional layer sensor with the length between the electrode plates calculated by the operating unit to indicate that the length between the functional layers is not correct.

According to an aspect of the present invention, the defect detecting unit compares the length of the functional layer sensed by the functional layer sensor with the length of the previously coated functional layer in order to indicate that the functional layer is not coated correctly or that the length of the functional layer is not correct.

According to an aspect of the present invention, the functional layer is made of a ceramic material that is semi-transparent when not dried.

According to an aspect of the present invention, the functional layer sensor is an color sensor sensing color of the functional layer.

According to an aspect of the present invention, the first electrode plate sensor and/or the second electrode plate sensor is a sensor selected from a group consisting of a laser sensor, a color sensor, an infrared ray sensor, an optical sensor, and a supersonic wave sensor.

According to an aspect of the present invention, a functional layer coater is positioned behind the first electrode sensor and the second electrode sensor and before the functional layer sensor.

According to aspects of the present invention, the position of the functional layer that is semi-transparently coated onto the electrode disposed on the material and that is not dried is precisely measured and the measurement result is feedback to improve coating quality and productivity. Therefore, the quality of the coated functional layer is automatically managed through an inline test, a latent defect factor in the sequential winding process may be removed, and the stability of the lithium secondary battery may be improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, it is to be understood that where is stated herein that one element or layer is "formed on" or "disposed on" a second layer or element, the first layer or element may be formed or disposed directly on the second layer or element or there may be intervening layers or elements between the first layer or element and the second layer or element. Further, as used herein, the term "formed on" is used with the same meaning as "located on" or "disposed on" and is not meant to be limiting regarding any particular fabrication process.

Figure 1:
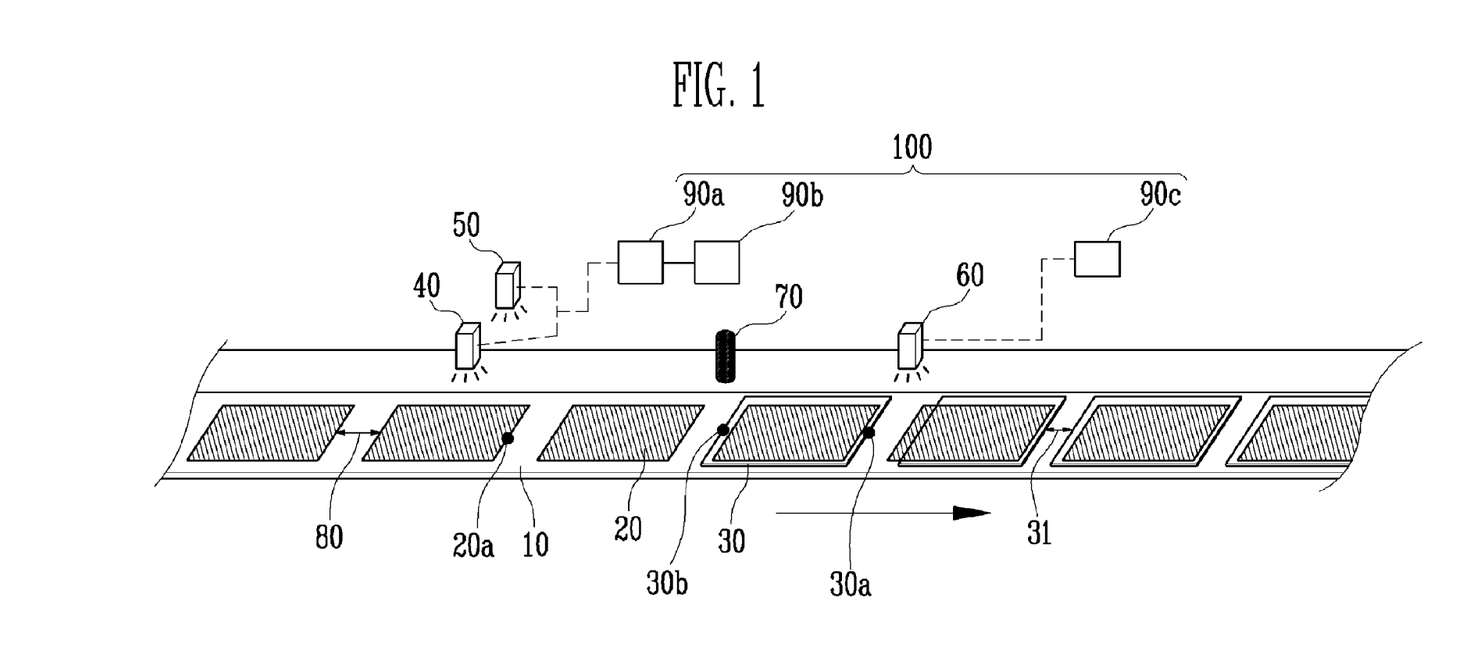
FIG. 1 is a perspective view illustrating a position detecting apparatus, according to an embodiment of the present invention, detecting a position of a functional layer coated on and electrode disposed on a material.
Figure 2:
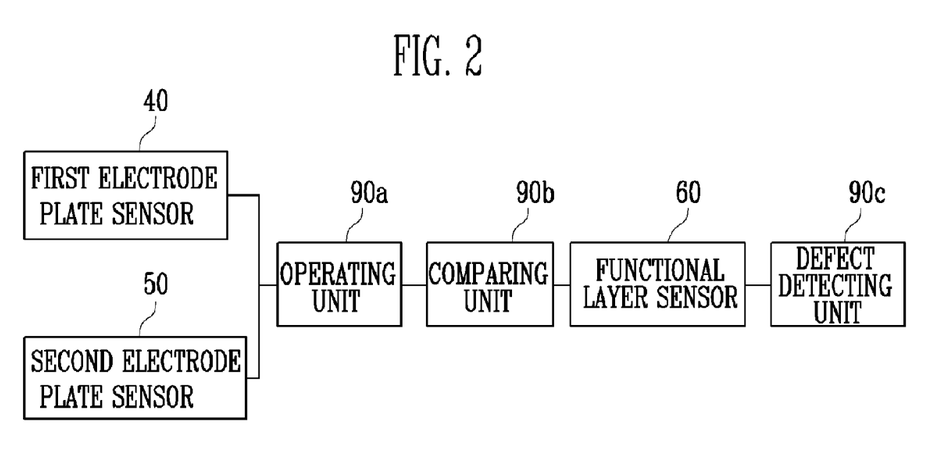
FIG. 2 is a block diagram illustrating the position detecting apparatus according to an embodiment of the present invention.

FIG. 1 is a perspective view illustrating a state in which a position detecting apparatus detecting a position of a functional layer coated on and electrode disposed on a material, according to an embodiment of the present invention. FIG. 2 is a block diagram illustrating the position detecting apparatus according to an embodiment the present invention.

Referring to FIGS. 1 and 2, the position detecting apparatus includes a first electrode plate sensor 40 disposed at a side of a material 10, a second electrode plate sensor 50 disposed at an other side of the material 10, a functional layer sensor 60 disposed behind the first electrode plate sensor 40 and the second electrode plate sensor 50 with respect to the direction in which the material 10 travels. The material 10 has electrode plates 20 continuously formed at uniform intervals. Additionally, the position detecting apparatus includes a controller 100 feeding back a feedback result indicating whether a functional layer 30 is positioned correctly, wherein the feedback result includes values sensed by the first electrode plate sensor 40, the second electrode plate sensor 50 and the functional layer sensor 60.

A functional layer coater 70 is disposed between a position of the functional layer sensor 60 and a position of the first electrode plate sensor 40 and the second electrode plate sensor 50. The functional layer coater 70 coats the functional layers 30 onto the electrode plates 20.

The first electrode plate sensor 40 or the second electrode plate sensor 50 is a sensor selected from the group consisting of a laser sensor, an RGB sensor, an infrared ray sensor, an optical sensor, and a supersonic wave sensor. However, aspects of the present invention are not limited thereto and other similar sensors may be used. The first electrode plate sensor 40 senses a start point 20a of the electrode plate 20 and the second electrode plate sensor 50 senses a length of the electrode plate 20 corresponding to the starting point 20a. The functional layer sensor 60, which is an RGB sensor, senses a difference in color along the functional layer in order to sense the position and length of the functional layer 30, which is made of a ceramic material that is semi-transparent before being dried on the electrode plate 20.

The controller 100 feeds back the feedback result indicating whether the position of the functional layer 30 is correct. The feedback result includes the values sensed by the first electrode plate sensor 40, the second electrode plate sensor 50, and the functional layer sensor 60. The controller 100 includes an operating unit 90a, a comparing unit 90b, and a defect detecting unit 90c.

The operating unit 90a calculates a length 80 between two adjacent electrode plates 20 and a start point 30a and an end point 30b of the electrode plate 20 to be coated with the functional layer 30 and calculates a position of the functional layer 30 to be coated on the electrode plate 20. The operating unit 90a calculates the length 80 and the position of the functional layer 30 to be coated on the electrode plate 20 according to the values sensed by the first electrode plate sensor 40 and the second electrode plate sensor 50. The comparing unit 90b compares the position of the functional layer 30 calculated by the operating unit 90a with the position of the previously coated functional layer 30. The defect detecting unit 90c compares the values calculated by the operating unit 90a, such as length 80, the start point 30a and the end point 30b, or compares the length of the previously coated functional layer 30 with the length of the functional layer 30 to be coated as sensed by the functional layer sensor 60 to provide the feedback result indicating whether the previously coated functional layer 30 is correct.

That is, when the length of the functional layer 30 previously coated is not correct, a control operation may be performed such that the defect detecting unit 90c generates an alarm. When the length of the previously coated functional layer 30 is correct, the coating of the functional layer 30 to be coated is performed in a normal manner.

Figure 3:
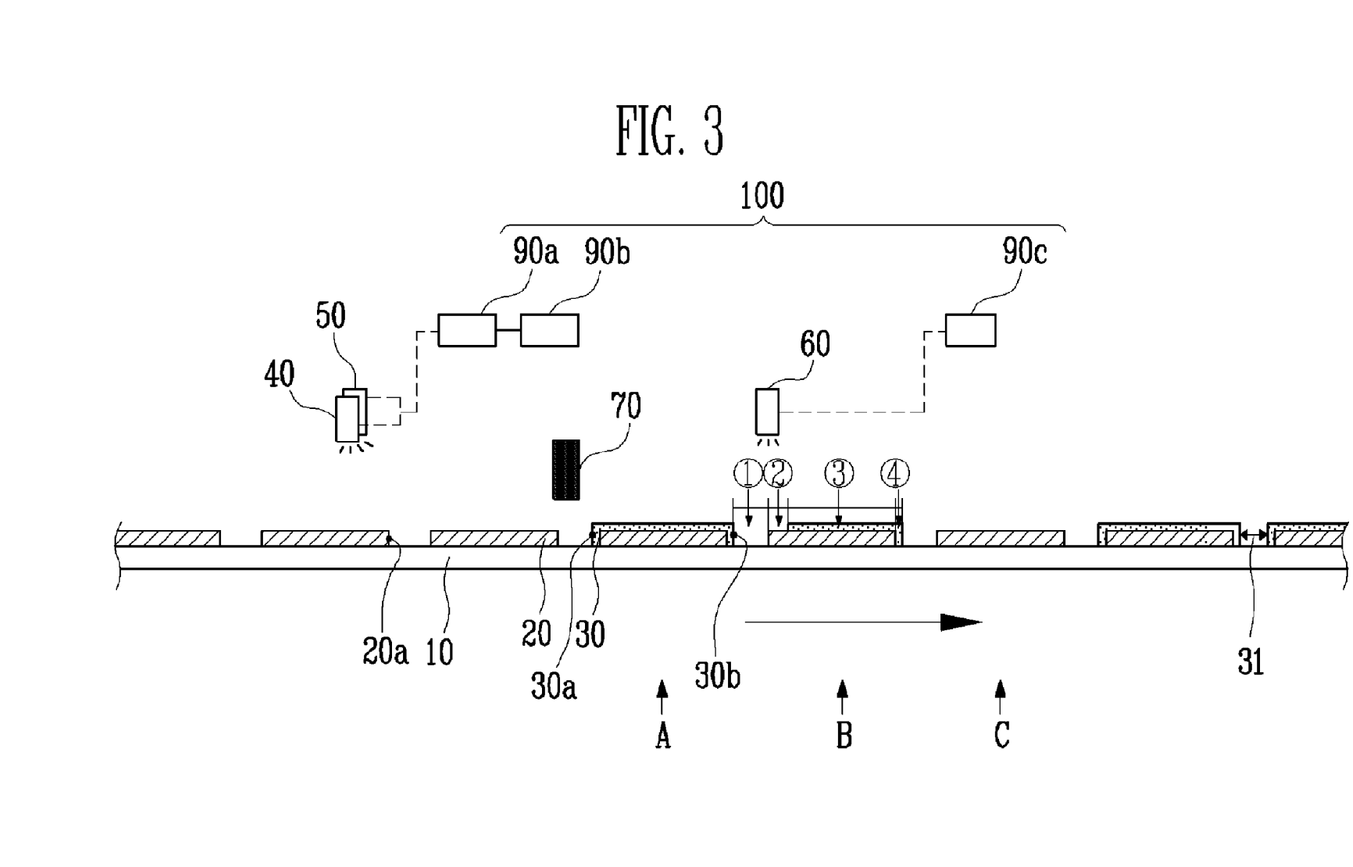
FIG. 3 is a sectional view illustrating various states in which a functional layer is coated.

FIG. 3 is a sectional view illustrating various states in which a functional layer is coated. Referring to FIG. 3, in order to improve the thermal stability of the secondary battery, the electrode plate 20 formed on the material 10 is coated with the functional layer 30. Part A of the material 10 is an area in which the functional layer 30 is correctly coated or positioned on the electrode plate 20 in the correct position. Part B of the material 10 is an area in which the coating of the functional layer 30 pushed to one side, or, in other words, the functional layer 30 is incorrectly coated or positioned. Part C of the material 10 is an area in which an electrode plate 20 does not have the functional layer 30 coated thereon.

Since the functional layer 30 is formed of a ceramic material that is semi-transparent when not dried, the regions ①, ②, ③, ④ in the part B of the material 10 may be distinguished by the RGB sensor 60 provided on the material 10. Therefore, the RGB sensor 60, which is the functional layer sensor 60 according to an embodiment the present invention, distinguishes the electrode plate 20 from the functional layer 30 and senses whether the functional layer 30 is formed having correct position and length.

The region ① is not coated with the electrode plate 20 or the functional layer 30. In the region ②, the functional layer 30 has been pushed aside so that only the electrode plate 20 is formed on the material 10 in the region ②. In the region ③, the electrode plate 20 is coated with the functional layer 30. In the region ④, the material 10 is coated with the functional layer 30. In the present embodiment, the functional layer 30 is coated in the form of a thin film. In order to determine the position of the functional layer 30, which is semi-transparent before being dried, the regions ①, ②, ③, ④ should be correctly detected, and thus, it can be determined whether the functional layer 30 is correctly coated onto the electrode plate 20 and is in a correct position.

The results of detecting the regions ①, ②, ③, ④ using various sensors are illustrated in TABLE 1.

TABLE 1

| Sensor Type | Region Type | | | |
| --- | --- | --- | --- | --- |
| | ① Material | ② Functional layer coated on a material | ③ Functional layer coated on an electrode plate | ④ Electrode plate coated on a material |
| Color (RGB) sensor | 200 to 300 | 450 to 470 | 950 to 980 | ∞ |
| Optical sensor | 1,020 to 1,060 | 1,000 to 1,050 | 180 to 230 | 200 to 250 |

As illustrated in TABLE 1, the sensors used for the experiments are the color sensor and the optical sensor. Since the optical sensor does not correctly detect a distinction in the amount of color between the regions ① and ② or between the regions ③ and ④, or shows a fine difference in values, the optical sensor does not reliable detect the regions. In contrast, the color sensor shows a significant difference in the detected values of the regions ①, ②, ③, ④, the color sensor is used in the position detecting apparatus according to the present embodiment of the invention. Although not shown in TABLE 1, since the experiment results obtained by the infrared ray sensor, the supersonic wave sensor, and the laser sensor are similar to the experiment results obtained by the optical sensor, the color sensor is suitable for the apparatus for detecting the position of the electrode plate 20. However, aspects of the present invention are not limited thereto and other sensors able to distinguish between the regions ①, ②, ③, ④ may be used.

Figure 4A:
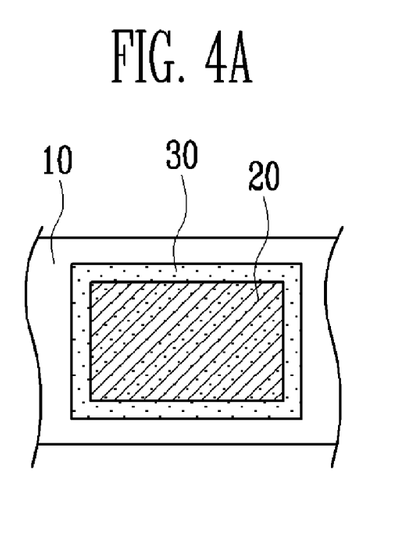
FIG. 4A is a plan view illustrating the part A of FIG. 3 and a state in which the functional layer is correctly coated.
Figure 4B:
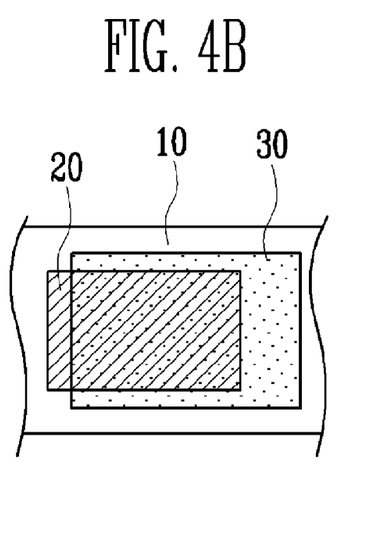
FIG. 4B is a plan view illustrating the part B of FIG. 3 and a state in which the functional layer is incorrectly coated.
Figure 4C:
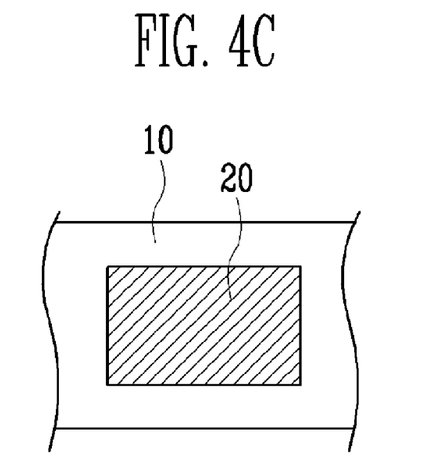
FIG. 4C is a plan view illustrating the part C of FIG. 3 and a state in which the functional layer is not coated.

FIG. 4A is a plan view illustrating the part A of FIG. 3 and a state in which the functional layer 30 is normally coated. FIG. 4B is a plan view illustrating the part B of FIG. 3 and a state in which the functional layer 30 is pushed aside and is incorrectly coated onto the electrode plate 20. FIG. 4C is a plan view illustrating the part C of FIG. 3 and a state in which the functional layer 30 is not coated onto the electrode plate.

Referring to the parts A, B, and C of FIG. 3, the regions ①, ②, ③, ④ of part B are sensed by the functional layer sensor 60 using a difference in color. Since the functional layer 30 is a semi-transparent solid before being dried, the color of the material 10 may be visible through the functional layer 30 before being dried. Therefore, the regions ①, ②, ③, ④ have different colors, respectively, and information on the length and the position of the coated functional layer 30 may be obtained by measuring the difference in color.

Referring to FIG. 4A, the functional layer 30 is coated on the electrode plate 20 of the material 10 in the correct position. In such a case, the length of the functional layer 30 coated on the material 10 is added to the length of the functional layer 30 coated on the electrode plate 20 in order to determine the length of the coated functional layer 30.

Referring to FIG. 4B, even when the functional layer 30 is pushed to one side, or in other words, incorrectly coated, detection of the position of the functional layer 30 is performed using a detected difference in color between the regions ①, ②, ③, ④. That is, a color of the material 10, a color of the electrode plate 20 that is not coated with the functional layer 30, a color of the electrode plate 20 coated with the functional layer 30, and a color of the material 10 coated with the functional layer 30 are distinguished from each other in order to determine the length and position of the coated functional layer 30.

In addition, referring to FIG. 4C, if the functional layer 30 is not coated, it can be determined that the functional layer 30 is not coated using the difference in colors between the material 10 and the electrode plate 20.

As described above, in the position detecting apparatus, according to an embodiment of the present invention, the feedback result is determined through the detecting the length and position of the functional layer 30 and generating an alarm suitable for each situation in order to detect and determine that a defective functional layer 30 exists. In addition, the determined defective functional layer 30 is removed so that the defective functional layer 30 is not used in a sequential winding process.

Figure 5:
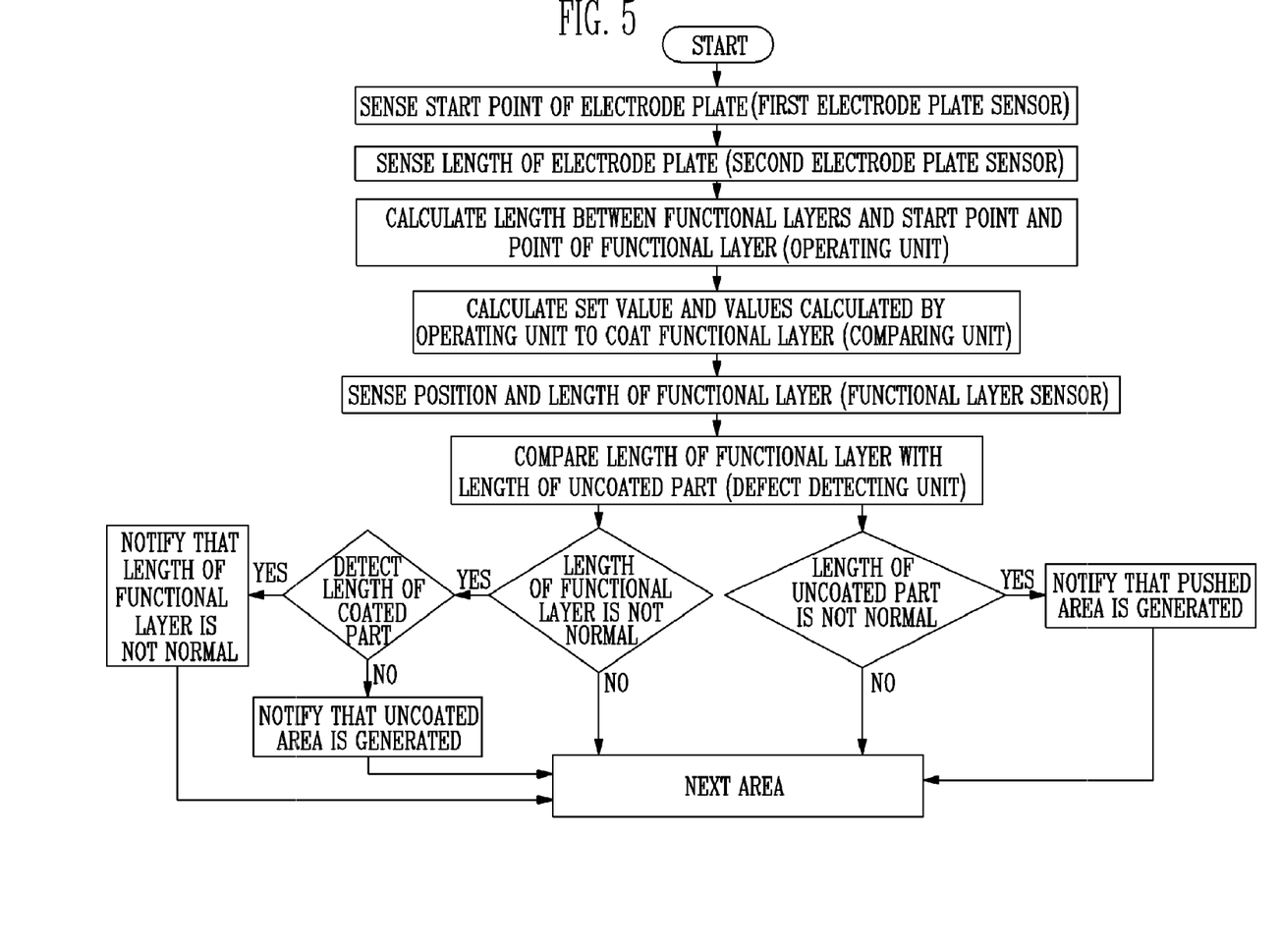
FIG. 5 is flow chart illustrating an operation of feeding back a feedback result indicating whether the position of the functional layer is correct, as detected by the position detecting apparatus according to an embodiment of the present invention.

FIG. 5 is a flowchart illustrating feeding back a feedback result indicating whether the functional layer 30 is correctly coated by the position detecting apparatus according to an embodiment of the present invention.

Referring to FIG. 5, the position detecting apparatus, according to aspects of the present invention, includes the first electrode plate sensor 40, the second electrode plate sensor 50, the functional layer sensor 60, the operating unit 90a, the comparing unit 90b, and the defect detecting unit 90c, as illustrated in FIG. 2. The first electrode plate sensor 40 senses the start point 20a of the electrode plate 20 and the second electrode plate sensor 50 senses the length of the electrode plate 20. The operating unit 90a calculates the length 80 between two adjacent electrode plates 20 and the values of the start point 30a and the end point 30b the functional layer 30 to be coated.

The comparing unit 90b compares the position of the functional layer 30 calculated by the operating unit 90a with a position of the previously coated functional layer 30. The comparing unit 90b compares the position of the functional layer 30 calculated by the operating unit 90a with the position of the previously coated functional layer 30 in order to determine an offset length value and to coat the functional layer 30 to be coated.

If the functional layer 30 is coated according to the calculations of the comparing unit 90b, the position and length of the functional layer 30 formed on the electrode plate 20 are determined by the functional layer sensor 60 which is an RGB sensor sensing a difference in color of the regions ①, ②, ③, ④.

Next, the feedback result indicating whether the functional layer 30 is correct is fed back by the defect detecting unit 90c, wherein the feedback result is determined by using the values sensed by the first electrode plate sensor 40, the second electrode plate sensor 50, and the functional layer sensor 60. That is, the defect detecting unit 90c compares the various values calculated by the operating unit 90a in order to feedback whether the previously coated functional layer 30 is correct.

In order to determine the feedback result, the defect detecting unit 90c compares the length of the functional layer 30 sensed by the functional layer sensor 60 with the length 80 between the electrode plates 20 calculated by the operating unit 90a to indicate that the functional layer 30 is pushed to one side, or in other words, incorrectly coated, and generates a corresponding alarm when the length 31 between two adjacent functional layers 30 is not normal or correct. In addition, the defect detecting unit 90c compares the length of the functional layer 30 sensed by the functional layer sensor 60 with the length of the previously coated functional layer 30 to notify that a pushed period is generated through alarming when the length 31, which is an uncoated area between two adjacent functional layers 30 or the length of the functional layer 30 are not normal. If the length of the functional layer or the length 31 between two adjacent functional layers 30 is normal, the sequential winding period is performed.

By using the position detection apparatus detecting a position of the functional layer 30 disposed on the electrode plate 20 according to aspects of the present invention, after the position of the functional layer 30 coated on the electrode plate 20 and on the material 10 in semi-transparent and non-dried states is precisely measured, the measurement result is fed back in order to improve coating quality and productivity. Therefore, the quality of the functional layer 30 coated through an inline test may be automatically managed, a latent defect factor may be removed in the sequential winding process, and the stability of the lithium secondary battery may be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus detecting a position of a functional layer on an electrode plate, comprising:
   a first electrode plate sensor disposed at a side of a material to sense start points of electrode plates continuously formed on the material at uniform intervals;
   a second electrode plate sensor disposed at an other side of the material to sense a length of the electrode plate;
   a functional layer sensor provided behind the first electrode plate sensor and the second electrode plate sensor above a material traveling direction to sense position and length of the functional layer formed on the electrode by sensing a difference in color; and
   a controller feeding back a feedback result indicating whether the functional layer is correctly positioned through values sensed by the first electrode plate sensor, the second electrode plate sensor, and the functional layer sensor.

2. The apparatus as claimed in claim 1, wherein the controller comprises:
   an operating unit calculating a length between adjacent electrode plates and a start point and an end point to be coated with the functional layer according to the values sensed by the first electrode plate sensor and the second electrode plate sensor;
   a comparing unit comparing the position of the functional layer to be coated according to calculations of the operating unit with the position of a previously coated functional layer; and
   a defect detecting unit comparing the values calculated by the operating unit with each other and feeding back the feedback result indicating whether the functional layer to be coated is correctly positioned.

3. The apparatus as claimed in claim 2, wherein the defect detecting unit compares the length of the functional layer sensed by the functional layer sensor with the length of the previously coated functional layer in order to indicate that the functional layer is not coated correctly or that the length of the functional layer is not correct.

4. The apparatus as claimed in claim 2, wherein the defect detecting unit compares the length of the functional layer sensed by the functional layer sensor with the length between the electrode plates calculated by the operating unit to indicate that the length of the functional layer is not correct.

5. The apparatus as claimed in claim 1, wherein the functional layer is made of a ceramic material that is semi-transparent when not dried.

6. The apparatus as claimed in claim 1, wherein the functional layer sensor is an color sensor sensing colors of the functional layer.

7. The apparatus as claimed in claim 1, wherein the first electrode plate sensor and/or the second electrode plate sensor is a sensor selected from a group consisting of a laser sensor, a color sensor, an infrared ray sensor, an optical sensor, and a supersonic wave sensor.

8. The apparatus as claimed in claim 1, further comprising a functional layer coater positioned behind the first electrode sensor and the second electrode sensor and before the functional layer sensor.

9. The apparatus as claimed in claim 8, wherein the functional layer coater coats the functional layer onto the electrode plate according to the controller.

10. A position detecting apparatus detecting positions of functional layers coated onto electrode plates disposed on a material, the position detecting apparatus comprising:
    a first electrode plate sensor sensing start points of electrode plates sequentially disposed on a material travelling in a direction underneath the position detecting apparatus;
    a second electrode plate sensor sensing end points of the electrode plates;
    a functional layer sensor sensing the positions and lengths of the functional layers coated onto the electrode plates; and
    a controller determining whether the functional layers are correctly coated onto the electrode plates according to the start and end points of the electrode plates and the positions and lengths of the functional layers.

11. The apparatus of claim 10, wherein the first electrode plate sensor is disposed at a side of the material and the second electrode sensor is disposed at another side of the material.

12. The apparatus of claim 10, wherein the first electrode plate sensor and the second electrode plate sensor are disposed adjacent to each other in a direction perpendicular to the direction of travel of the material.

13. The apparatus of claim 10, wherein the functional layer sensor is disposed at one side of both the first electrode plate sensor and the second electrode plate sensor in the direction of travel of the material.

14. The apparatus of claim 10, wherein the controller comprises:
an operating unit calculating a length between adjacent electrode plates and a start point and an end point on the material to be coated with the functional layer according to the values sensed by the first electrode plate sensor and the second electrode plate sensor;
a comparing unit comparing the position of the functional layer to be coated according to calculations of the operating unit with the position of the previously coated functional layer; and
a defect detecting unit detecting whether the functional layer to be coated is correctly positioned according the values calculated by the operating unit and the comparing unit and feeding back the detection result as a feedback result.

15. The apparatus of claim 14, further comprising a functional layer coater coating the functional layers onto the electrode plates according to the feedback result.

16. The apparatus of claim 15, wherein the functional layer coater adjusts the position of the functional layer to be coated according to whether a previously coated functional layer is positioned correctly as detected by the controller.

17. The apparatus as claimed in claim 14, wherein the defect detecting unit compares the length of the functional layers sensed by the functional layer sensor with the lengths of the previously coated functional layers in order to indicate that the functional layers are not coated correctly or that the length of the functional layers are not correct.

18. The apparatus as claimed in claim 14, wherein the defect detecting unit compares the lengths of the functional layers sensed by the functional layer sensor with the lengths between the electrode plates calculated by the operating unit to indicate that the lengths between the functional layers are not correct.

19. The apparatus as claimed in claim 10, wherein the functional layer is made of a ceramic material that is semi-transparent when not dried.

20. The apparatus of claim 10, wherein the functional layer sensor is a color sensor sensing colors of the functional layer.

21. The apparatus as claimed in claim 10, wherein the first electrode plate sensor or the second electrode plate sensor is one selected from the group consisting of a laser sensor, an RGB sensor, an infrared ray sensor, an optical sensor, and a supersonic wave sensor.

22. A method of calculating a position of a functional layer to be coated onto an electrode plate to be coated disposed on a material, the method comprising:
detecting a start point of the electrode plate to be coated;
detecting a length of the electrode plate to be coated by detecting an end point of the electrode plate to be coated;
detecting a position of a previously coated functional layer coated onto an electrode plate disposed on the material behind the electrode plate to be coated with the functional layer; and
calculating the position of the functional layer to be coated onto the electrode plate to be coated according to the detecting of the start point of the electrode plate to be coated, the detecting of the length of the electrode plate to be coated and the detecting of the position of the previously coated functional layer.

23. The method of claim 22, wherein the detecting of the position of the previously coated functional layer coated onto the electrode plate comprises detecting different colors corresponding to the functional layer coated onto the material, the functional layer coated onto the electrode, the electrode and the material.

24. The method of claim 22, wherein the calculating of the position of the functional layer to be coated onto the electrode plate comprises calculating a length between two adjacent electrode plates in order to calculate the position of the functional layer to be coated onto the electrode plate to be coated according to whether the position of the previously coated functional layer is correct.

25. The method of claim 22, further comprising adjusting the position of the functional layer to be coated onto the electrode plate to be coated if the position of the previously coated functional layer is not correct in order to completely cover the electrode plate to be covered with the functional layer to be coated.

26. A method of determining a position of a functional layer coated onto an electrode plate disposed on a material, the method comprising:
detecting a first color of an area where the functional layer is coated only on the material;
detecting a second color of an area where the functional layer is coated onto the electrode plate;
detecting a third color of an area where the functional layer is not coated onto the electrode plate;
detecting a fourth color of an area having only the material; and
determining the position of the functional layer according to the first through fourth colors,
wherein the first color corresponds to a start point and the end point of the functional layer, the second color corresponds to an area where the functional layer is coated onto the electrode plate, the third color corresponds to an area not having the functional layer coated onto the electrode plate, and the fourth color corresponds to an area between two adjacent electrode plates.

27. The method of claim 26, wherein the determining the position of the functional layer comprises:
determining the start point of the functional layer according to the detecting of the first color;
determining the area where the functional layer is coated onto the electrode plate according to the second color; and
determining the end point of the functional layer according to one of the third color or the fourth color.

28. The method of claim 27, wherein the determining the end point of the functional layer according to the third color indicates that the functional layer is incorrectly coated onto the electrode plate and the determining the end point of the functional layer according to the fourth color indicates that the functional layer is correctly coated onto the electrode plate.

* * * * *